US010659482B2

(12) United States Patent
Shannon et al.

(10) Patent No.: US 10,659,482 B2
(45) Date of Patent: May 19, 2020

(54) ROBOTIC PROCESS AUTOMATION RESOURCE INSULATION SYSTEM

(71) Applicant: Bank of America Corporation, Charlotte, NC (US)

(72) Inventors: Stephen Shannon, Charlotte, NC (US); Manu Jacob Kurian, Dallas, TX (US); Michael Emil Ogrinz, Easton, CT (US); Monika V. Kapur, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 217 days.

(21) Appl. No.: 15/793,708

(22) Filed: Oct. 25, 2017

(65) Prior Publication Data
US 2019/0124100 A1    Apr. 25, 2019

(51) Int. Cl.
*H04L 29/06* (2006.01)
*G06F 21/62* (2013.01)
(Continued)

(52) U.S. Cl.
CPC .......... *H04L 63/1425* (2013.01); *B25J 11/00* (2013.01); *G06F 21/6218* (2013.01); *H04L 63/101* (2013.01); *H04L 63/1441* (2013.01); *H04L 63/1491* (2013.01); *G06N 3/04* (2013.01); *G06N 3/08* (2013.01)

(58) Field of Classification Search
CPC ............... H04L 63/101; H04L 63/1441; H04L 63/1425; H04L 63/1491; G06F 21/6218
See application file for complete search history.

(56) References Cited

U.S. PATENT DOCUMENTS 5,907,709 A    5/1999  Cantey et al.
6,240,183 B1   5/2001  Marchant
(Continued)

OTHER PUBLICATIONS

D. Portugal, S. Pereira and M. S. Couceiro, "The role of security in human-robot shared environments: A case study in ROS-based surveillance robots," 2017 26th IEEE International Symposium on Robot and Human Interactive Communication (RO-MAN), Lisbon, 2017, pp. 981-986. (Year: 2017).*

(Continued)

*Primary Examiner* — Kari L Schmidt
(74) *Attorney, Agent, or Firm* — Michael A. Springs; Moore & Van Allen PLLC; James C. Edwards

(57) ABSTRACT

A system for implementing robotic process automation (RPA) to enhance computer network security. Specifically, RPA is used to detect an unauthorized attempt to access a dataset and, in response, the unauthorized entity is provided access to a bot-generated modified dataset that includes modified data elements that are reasonable facsimiles of the actual data elements and do not expose confidential data. Once access to the modified data set is provided, RPA is implemented to track actions by the unauthorized entity accessing the modified data set and, once copied, RPA is implemented to track usage of the data by the unauthorized entity. Additionally, RPA may be implemented to mitigate damages caused by attempts or actual accessing of the actual datasets by performing actions that prevent further damages, such as deactivating/activating resource storage and authorizing previously configured resource events.

16 Claims, 7 Drawing Sheets

(51) Int. Cl.
  *B25J 11/00* (2006.01)
  *G06N 3/08* (2006.01)
  *G06N 3/04* (2006.01)

(56) References Cited

U.S. PATENT DOCUMENTS

| | | | |
|---|---|---|---|
| 6,738,908 B1 | 5/2004 | Bonn et al. | |
| 6,754,678 B2 | 6/2004 | Norris et al. | |
| 7,140,044 B2 | 11/2006 | Redlich et al. | |
| 7,146,644 B2 | 12/2006 | Redlich et al. | |
| 7,174,563 B1 | 2/2007 | Brownlie et al. | |
| 7,191,252 B2 | 3/2007 | Redlich et al. | |
| 7,260,844 B1 | 8/2007 | Tidwell et al. | |
| 7,383,578 B2* | 6/2008 | Blake | H04L 63/1441 709/224 |
| 7,606,915 B1* | 10/2009 | Calinov | G06F 21/36 709/229 |
| 7,672,737 B2 | 3/2010 | Hood et al. | |
| 7,680,809 B2 | 3/2010 | Deng et al. | |
| 7,752,554 B2 | 7/2010 | Biggs et al. | |
| 7,861,252 B2 | 12/2010 | Uszok et al. | |
| 7,937,624 B2 | 5/2011 | Qing et al. | |
| 7,966,654 B2 | 6/2011 | Crawford | |
| 7,966,655 B2 | 6/2011 | Acharya et al. | |
| 7,966,659 B1* | 6/2011 | Wilkinson | H04L 63/0209 726/11 |
| 8,065,719 B2 | 11/2011 | Yang | |
| 8,171,406 B1 | 5/2012 | Newstadt et al. | |
| 8,239,674 B2* | 8/2012 | Lee | G06F 21/6218 713/165 |
| 8,285,652 B2 | 10/2012 | Biggs et al. | |
| 8,397,282 B2 | 3/2013 | Turley et al. | |
| 8,418,240 B2 | 4/2013 | Wool | |
| 8,448,139 B2 | 5/2013 | Ghosh | |
| 8,549,643 B1 | 10/2013 | Shou | |
| 8,572,733 B1* | 10/2013 | Rockwood | H04L 63/1433 709/224 |
| 8,588,767 B2 | 11/2013 | Fujimoto et al. | |
| 8,793,578 B2 | 7/2014 | Mounty et al. | |
| 8,819,825 B2 | 8/2014 | Keromytis et al. | |
| 8,935,673 B1 | 1/2015 | Ashkenazi et al. | |
| 8,955,743 B1 | 2/2015 | Block et al. | |
| 9,021,419 B2 | 4/2015 | Pana et al. | |
| 9,105,143 B1 | 8/2015 | Huggins et al. | |
| 9,215,213 B2 | 12/2015 | Bansal et al. | |
| 9,280,406 B2 | 3/2016 | Ghosh | |
| 9,311,632 B1 | 4/2016 | Dent | |
| 9,356,942 B1 | 5/2016 | Joffe | |
| 9,356,957 B2 | 5/2016 | Keromytis et al. | |
| 9,450,901 B1 | 9/2016 | Smullen et al. | |
| 9,462,013 B1* | 10/2016 | Boss | H04L 63/1491 |
| 9,555,544 B2 | 1/2017 | Bataller et al. | |
| 9,600,456 B2 | 3/2017 | Sriganesh et al. | |
| 9,641,544 B1 | 5/2017 | Treat et al. | |
| 9,647,968 B2 | 5/2017 | Smullen et al. | |
| 9,667,596 B2 | 5/2017 | Halabi | |
| 9,674,222 B1 | 6/2017 | Joffe | |
| 9,817,967 B1* | 11/2017 | Shukla | G06F 21/52 |
| 9,923,908 B2* | 3/2018 | Boss | H04L 63/1416 |
| 10,110,629 B1* | 10/2018 | Kruse | H04L 63/1491 |
| 10,187,337 B2 | 1/2019 | Smullen et al. | |
| 10,404,747 B1* | 9/2019 | Sela | H04L 63/0281 |
| 10,482,232 B2* | 11/2019 | Buddhiraju | G06F 21/33 |
| 10,574,698 B1* | 2/2020 | Sharifi Mehr | H04L 63/1425 |
| 2002/0184528 A1 | 12/2002 | Shevenell et al. | |
| 2003/0046583 A1 | 3/2003 | Goldman et al. | |
| 2004/0168173 A1* | 8/2004 | Cohen | G06F 21/52 719/310 |
| 2005/0044418 A1 | 2/2005 | Miliefsky | |
| 2005/0076237 A1* | 4/2005 | Cohen | G06F 9/468 726/4 |
| 2005/0166072 A1* | 7/2005 | Converse | H04L 63/1441 726/5 |
| 2006/0090136 A1 | 4/2006 | Miller et al. | |
| 2006/0191010 A1 | 8/2006 | Benjamin | |
| 2007/0074273 A1 | 3/2007 | Linden | |
| 2007/0143847 A1* | 6/2007 | Kraemer | G06F 21/554 726/23 |
| 2008/0168425 A1 | 7/2008 | Sen et al. | |
| 2008/0269949 A1 | 10/2008 | Norman et al. | |
| 2010/0088396 A1 | 4/2010 | Armerding | |
| 2010/0114840 A1 | 5/2010 | Srivastava et al. | |
| 2010/0223327 A1* | 9/2010 | Srivastava | H04N 7/17318 709/203 |
| 2011/0126273 A1 | 5/2011 | Bhatia et al. | |
| 2011/0131644 A1 | 6/2011 | Keanini et al. | |
| 2011/0178619 A1 | 7/2011 | Jung et al. | |
| 2011/0282508 A1 | 11/2011 | Goutard et al. | |
| 2013/0031037 A1 | 1/2013 | Brandt et al. | |
| 2013/0227697 A1 | 8/2013 | Zandani | |
| 2014/0137271 A1 | 5/2014 | Hyde et al. | |
| 2014/0359708 A1* | 12/2014 | Schwartz | G06F 15/173 726/4 |
| 2015/0213369 A1* | 7/2015 | Brandt | H04L 63/1408 706/12 |
| 2016/0006755 A1 | 1/2016 | Donnelly et al. | |
| 2016/0048502 A1 | 2/2016 | Montenegro et al. | |
| 2016/0134653 A1 | 5/2016 | Vallone et al. | |
| 2016/0266577 A1 | 9/2016 | Kerzner | |
| 2016/0335016 A1 | 11/2016 | Kurian et al. | |
| 2017/0177416 A1 | 6/2017 | Altman et al. | |
| 2017/0235940 A1* | 8/2017 | McEwen | G06F 21/31 726/19 |
| 2017/0269972 A1 | 9/2017 | Hosabettu et al. | |
| 2017/0270431 A1 | 9/2017 | Hosabettu et al. | |
| 2017/0352041 A1 | 12/2017 | Ramamurthy et al. | |
| 2017/0364355 A1* | 12/2017 | Nitschke | G06F 8/77 |
| 2018/0075233 A1* | 3/2018 | Gray | H04L 63/1466 |
| 2018/0160309 A1* | 6/2018 | Turgeman | G06F 21/316 |
| 2018/0197123 A1 | 7/2018 | Parimelazhagan et al. | |
| 2018/0285839 A1* | 10/2018 | Yang | G06Q 20/0655 |
| 2018/0329399 A1 | 11/2018 | Neelakandan et al. | |
| 2019/0004932 A1 | 1/2019 | Misra et al. | |
| 2019/0089740 A1 | 3/2019 | Hastings | |
| 2019/0102676 A1* | 4/2019 | Nazari | G06N 20/00 |
| 2019/0124114 A1* | 4/2019 | Purushothaman | H04L 63/20 |
| 2019/0129827 A1* | 5/2019 | Ramasamy | G06F 11/3664 |
| 2019/0130094 A1* | 5/2019 | Votaw | H04L 63/105 |
| 2019/0155225 A1* | 5/2019 | Kothandaraman | G06N 20/00 |
| 2019/0163916 A1* | 5/2019 | Steele | G06F 21/577 |
| 2019/0182289 A1* | 6/2019 | White | H04L 63/1433 |
| 2019/0188114 A1 | 6/2019 | Hopper et al. | |
| 2019/0332508 A1* | 10/2019 | Goyal | G06F 11/0715 |
| 2019/0347185 A1 | 11/2019 | Moore | |
| 2020/0067923 A1* | 2/2020 | Dasari | G06Q 10/00 |

OTHER PUBLICATIONS

Wickramasuriya, Jehan, et al. "Privacy protecting data collection in media spaces." Proceedings of the 12th annual ACM international conference on Multimedia. 2004, pp. 48-55. (Year: 2004).*

Seungwon Shin, Zhaoyan Xu and Guofei Gu, "Effort: Efficient and effective bot malware detection," 2012 Proceedings IEEE INFOCOM, Orlando, FL, 2012, pp. 2846-2850. (Year: 2012).*

Kyoungho An, Resource Management and Fault Tolerance Principles for Supporting Distributed Real-time and Embedded Systems in the Cloud, Dec. 3, 2012, ACM, pp. 1-6. (Year: 2012).

Shankar Mahadevan et al., A Network Traffic Generator Model for Fast Network-on-Chip Simulation, Mar. 7-11, 2005, ACM, vol. 2, pp. 780-785. (Year: 2005).

Lee Breslau et al., Advances in Network Simulation, IEEE, vol. 33, Issue: 5, May 2000, pp. 59-67. (Year: 2000).

J. Burns et al., Automatic Management of Network Security Policy, Aug. 7, 2002, IEEE, pp. 12-26. (Year: 2002).

* cited by examiner

ROBOTIC PROCESS AUTOMATION RESOURCE INSULATION SYSTEM

FIELD OF THE INVENTION

The present invention is generally directed to computer network security and, more specifically, using Robotic Process Automation (RPA) to investigate occurrence of an attempt to access a dataset through providing the unauthorized entity access to modified/fake dataset and providing automated functions to mitigate events associated with an unauthorized entity penetrating a computer network and/or gaining accessing to a dataset.

BACKGROUND

Threats to computer network are a constant concern. In this regard, data breaches are being reported at an alarming rate. Data breaches involve an unauthorized entity (i.e., "hacker" or the like) penetrating a computing access and gaining access to and copying data stored on the network. Typically the data that accessed and copied is highly personal data associate with customers and/or account holders, such as name, address, credit card account numbers, social security numbers and the like.

While the ultimate goal is to prevent such data breaches from occurring, sometimes either the unauthorized entity penetrates the network and/or the data breach occurs. While in other instances, sometimes the unauthorized entity penetrates the network but is prevented from gaining access to the data. In both instances measures may need to be taken to address the data breach and/or investigate the attempt to gain access to the data. For example, when a breach occurs a need exists to immediately address the repercussions associated with the unauthorized entity gaining possession of the data. Additionally, when penetration occurs and the unauthorized entity is subsequently prevented/denied from accessing/copying data, a need exists to determine the identity of the unauthorized entity and the intended use of the data by the unauthorized entity.

Robotic process automation, commonly referred to as "bots" is the term used to define software applications that run automated tasks (scripts). Typically, bots perform tasks that are both simple and structurally repetitive, at a much higher rate than would be possible for a human alone.

Therefore, a need exists to provide for mitigating events and actions associated with a data breach and investigating the occurrence of an unauthorized attempt to access/copy data. Additionally, a need exists to leverage the repetitive and simplified nature of robotic process automation as a means to mitigate events and actions associated with a data breach and/or investigate the occurrence of an unauthorized attempt to access/copy data

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods directed to heightening computer network security. Specifically, the present invention implements robotic process automation to investigate the occurrence of unauthorized attempts to access and/or copy data and mitigate damages in the event that a computer network has been penetrated and/or a data breach has or may have occurred.

In specific embodiments of the invention, robotic process automation is used be generate modified datasets. A modified data set includes one or more and, in some embodiments all, modified data elements. The modified data elements may be such that they are unusable to the unauthorized entity and/or undetectable to the unauthorized entity. In this regard, the modified data elements may be reasonably similar to actual data elements, such that the unauthorized entity is unable to detect that the data elements have been modified (i.e., the unauthorized entity believes they have accessed/copied the actual data set). For example the modified data elements may include reasonable modifications without affecting timestamps, data format (i.e., same number and configuration of rows, columns and the like) and other characteristics of the data element or dataset. The modified data elements and or modified data sets may be modified so as to not include any actual confidential information. In specific embodiments of the invention RPA is used to generate one or more random modified datasets for each data file/data set that an entity stores. In this regard, the random modified datasets may be batch generated and stored prior to an attempt by an unauthorized to access the actual dataset or, in other embodiments, the modified dataset may be generated, on demand, at the time of an unauthorized attempt to access the dataset.

Additionally, according to embodiments of the invention, robotics process automation is implemented to detect an attempt by an unauthorized entity to access a dataset and, in response to such detecting provide the unauthorized entity access to a modified dataset. The modified dataset having one or more, in some embodiments all, data elements modified such that the modified data elements are a reasonable facsimile of the actual data elements without providing actual confidential information. Thus, instead of providing the unauthorized entity access to the actual dataset, the unauthorized user is provided access to the modified, or otherwise "fake" dataset.

Once the unauthorized entity has access to the modified data set, robotic process automation may be used to monitor (i.e., track and record) the unauthorized entities actions taken on the modified dataset. Further, once the unauthorized entity has retrieved or otherwise copied at least a portion of the modified dataset, robotics process automation may be used to monitor the authorized entities use of dataset or date elements. Such use of the dataset/data elements may be conducted by aggregating data from a plurality of data sources and determining a source of truth based on the aggregated data, such that the source of truth indicates that at least one of the data sources is using at least a portion of the modified dataset.

In other embodiments of the invention, robotic process automation is implemented to mitigate any damages or possible damages associated with an attempt to access a dataset. In this regard, in response to detecting an attempt, robotic process automation may be invoked to determine a point of entry and a time of computer network penetration and determine/recover unauthorized entity actions that transpired from the time of computer network penetration until the time of the attempt to access the dataset. Such actions are analyzed for impact and, in response to the analysis, a robotics process automation may perform automated functions/actions that mitigate the impact of the actions, such as functions/actions that mitigate the impact of data accessed, such as deactivating resource storage, activating new resource storage, authorizing preconfigured resource events and the like.

A system for monitoring an unauthorized network intrusion defines first embodiments of the invention. The system includes a computing platform including a memory and at least one processor in communication with the first memory. Additionally, the system includes a first robotic process module that is stored in the memory and executable by the at least one processor. The first robotic module is configured to generate a modified version of a dataset. In specific embodiments, the modified version of the dataset includes at least one modified data element, each modified data element corresponding to a data element in the dataset and identifiable as modified by an entity that modified the dataset. In this regard, the modified data elements are reasonable or otherwise plausible data elements with metadata values and other characteristics (e.g., timestamps, structure, format and the like) that provides for the modified data elements to be a reasonable substitute for the actual data elements in the dataset. In other embodiments of the system, the modified version of the dataset may be a corrupt or otherwise unusable version of the dataset. The modified version of the dataset may be generated (and stored) prior to the detection of an unauthorized attempt to access a dataset or, dynamically, once the detection of the unauthorized attempt to access the dataset occurs.

The system additionally includes a second robotic process module that is stored in the memory, executable by the at least one processor and in distributed network communication with the first robotic process module. The second robotic process module is configured to detect a computer network-based attempt by an unauthorized entity to access the dataset, and, in response to detecting the computer network-based attempt to access the dataset, provide the unauthorized entity access to the modified version of the dataset, wherein the unauthorized entity is prevented from accessing the dataset.

In specific embodiments of the second robotic process module is further configured to detect the computer network-based attempt to access the data by aggregating data from a plurality of nodes within the computer network, and determining a source of truth based on the aggregated data that indicates detection of the computer network-based attempt to access the data.

In other specific embodiments of the system, the second robotic process module is further configured to, in response to detecting the computer network-based attempt to access the dataset, determine a first point in time that the unauthorized entity penetrated the computer network. In such embodiments of the system, the second robotic process module is further configured to track actions performed on the computer network by the unauthorized entity from at least the first point in time that the unauthorized entity penetrated the computer network until a second point in time that the attempt to access the dataset occurred. The tracked actions include one or more computer network entry points, computer network hardware and software accessed and data accessed. In such embodiments the system may further include a third robotic process module that is stored in the memory, executable by the processor and in distributed computing network communication with the second robotic process module. The third robotic process module is configured to receive from the second robotic process module the tracked actions, analyze the tracked actions to determine an impact on the data accessed, and in response to determining the impact, perform automated functions that mitigate the impact on the data accessed. The automated functions may include, but are not limited to, deactivating resource storage associated with the data accessed, activating a new resource storage, and authorizing preconfigured resource events associated with the data accessed.

In still further specific embodiments of the system, the second robotic process module is further configured to, in response to detecting the computer network-based attempt to access the dataset, create a tunnel connection that provides the unauthorized entity the access to the modified version of the dataset. In such systems the tunnel connection may be directed to a shared storage that stores the modified version of the dataset and is accessible to one or more authorized third-party entities. The authorized third-party entities access the shared storage to monitor the unauthorized entities accessing of the modified version of the dataset.

In still further embodiments the system includes a third robotic process module stored in the memory, executable by the at least processor and configured to, in response to the unauthorized entity accessing the modified version of the dataset, track access actions performed by the unauthorized entity. In related embodiments of the system, the third robotic process entity is further configured to, in response to the unauthorized entity obtaining (e.g., copying) at least a portion of the modified version of the dataset, monitor use of at least a portion of the modified version of the dataset. In such embodiments of the invention, monitoring use may include aggregating data from a plurality of data sources and determining a source of truth based on the aggregated data, wherein the source of truth indicates use of at least a portion of the modified dataset by one or more of the plurality of data sources.

In still further embodiments of the system, the first robotic process module stored in the memory, executable by the at least one processor and configured to generate a plurality of modified versions of a dataset, each of the plurality of modified versions of the dataset are associated with a level of severity of an attempt to access the dataset. In such embodiments of the system, the second robotic process module is further configured to determine the level of the severity of the attempt to access the dataset and, in response to determining the level of severity of the attempt to access the dataset, provide the unauthorized entity access to one of the plurality of modified versions of the dataset corresponding to the associated level of security.

In still further embodiments of the system, the first robotic process module is further configured to generate a modified version of a dataset that includes logic, which provides for, in response to the unauthorized user accessing or obtaining at least a portion of the modified version of the data set, at least one of (i) identifying the unauthorized entity, and (ii) identifying use of at least a portion of the modified version of the data set in a secondary system.

A computer-implemented method for protecting against unauthorized access of a dataset defines second embodiments of the invention. The computer-implemented method includes steps executed by at least one computer processing device. The steps include implementing first robotic process automation to generate a modified version of a dataset. The steps further include implementing second robotic process automation to (i) detect a computer network-based attempt by an unauthorized entity to access the dataset, and (ii) in response to detecting the computer network-based attempt to access the dataset, provide the unauthorized entity access to the modified version of the dataset.

A computer program product including a non-transitory computer-readable medium defines third embodiments of the invention. The computer-readable medium includes a first set of codes for causing a computer to implement a first robotic process automation to generate a modified version of a dataset. The computer-readable medium additionally includes a second set of codes for causing a computer to implement a second robotic process automation to detect a computer network-based attempt by an unauthorized entity to access the dataset, and a third set of codes for causing a computer to implement a second robotic process automation to, in response to detecting the computer network-based attempt to access the dataset, provide the unauthorized entity access to the modified version of the dataset.

Thus, according to embodiments of the invention, which will be discussed in greater detail below, the present invention provides for implementing robotic process automation (RPA) to enhance computer network security. Specifically, RPA is implemented to detect an unauthorized attempt to access a dataset and, in response, the unauthorized entity is provided access to a bot-generated modified dataset that includes modified data elements that are reasonable facsimiles of the actual data elements and do not expose confidential data. Once access to the modified data set is provided, RPA is used to track actions by the unauthorized entity accessing the modified data set and, once copied, RPA is implemented to track usage of the data by the unauthorized entity. Additionally, RPA is implemented to mitigate damages caused by attempts or actual accessing of the actual datasets by performing actions that prevent further damages, such as deactivating/activating resource storage and authorizing previously configured resource events.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
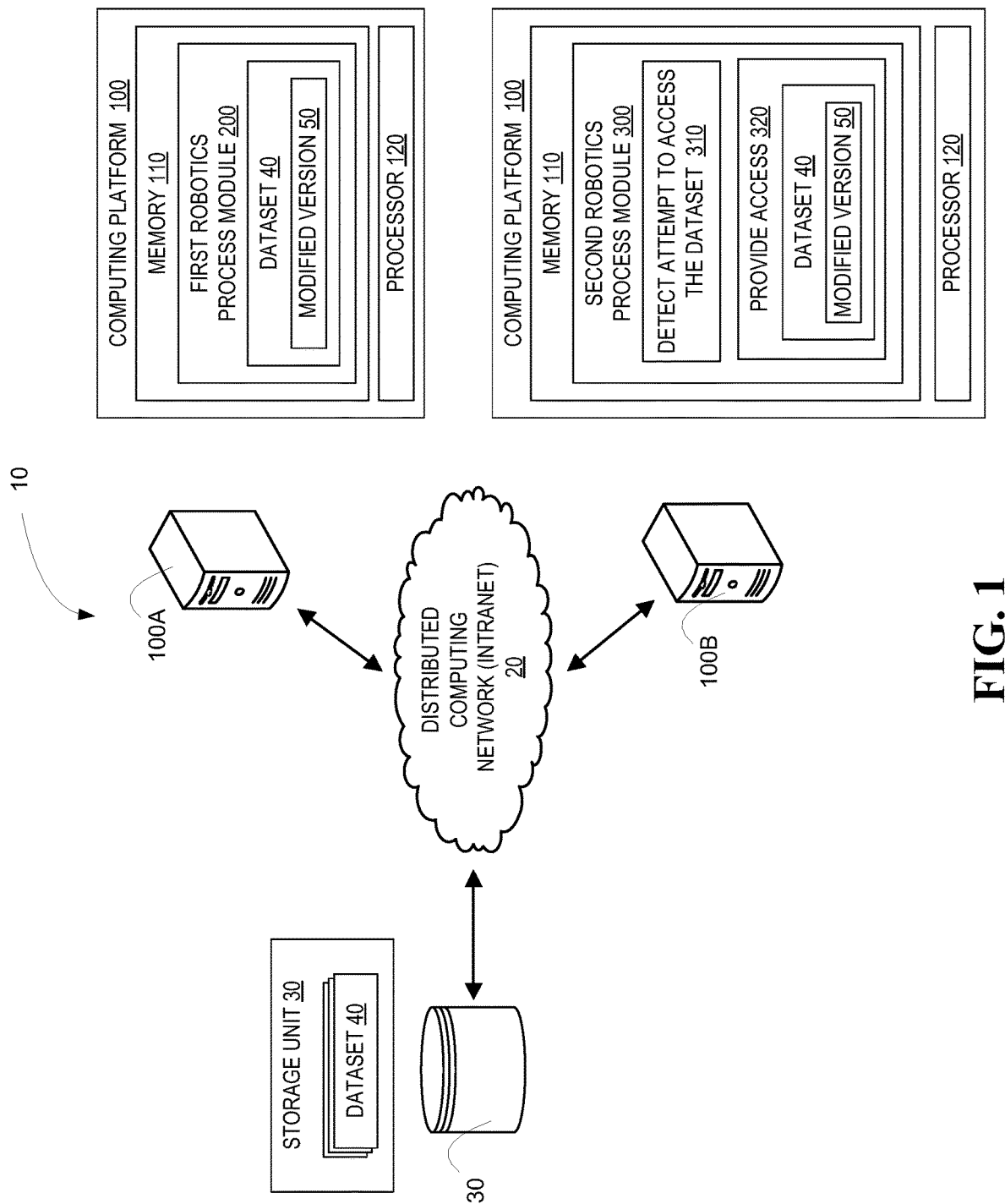
Figure 2:
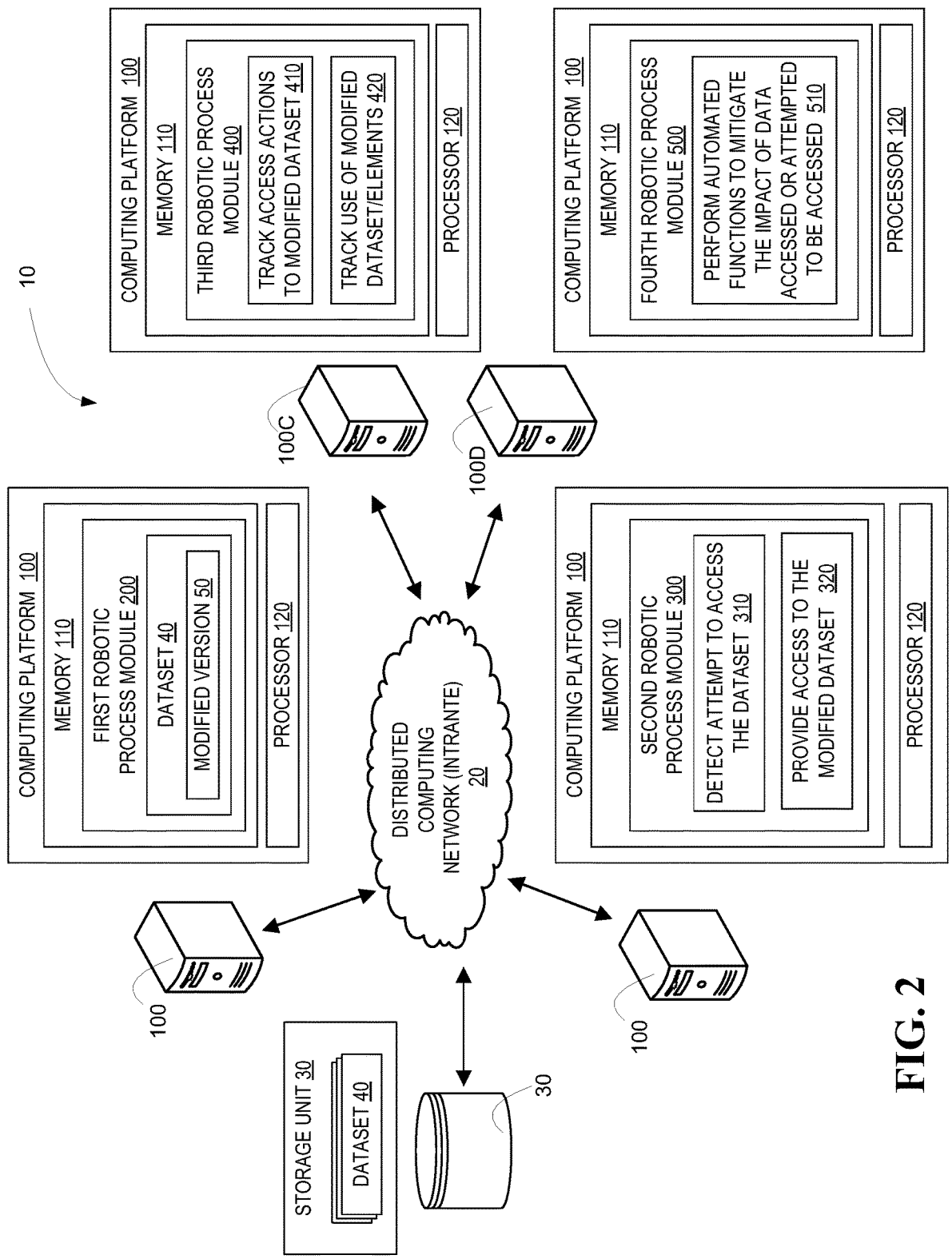
Figure 3:
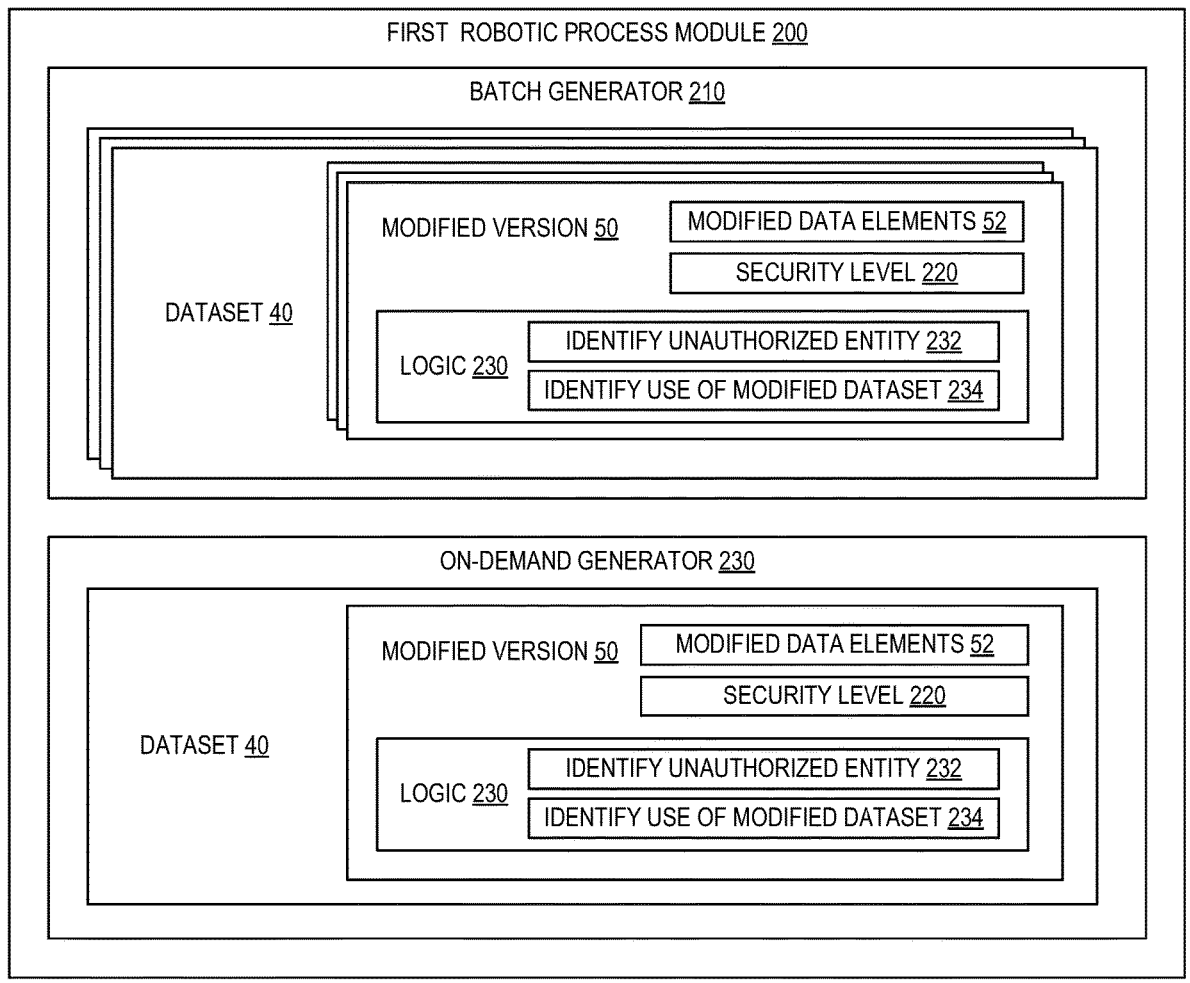
Figure 4:
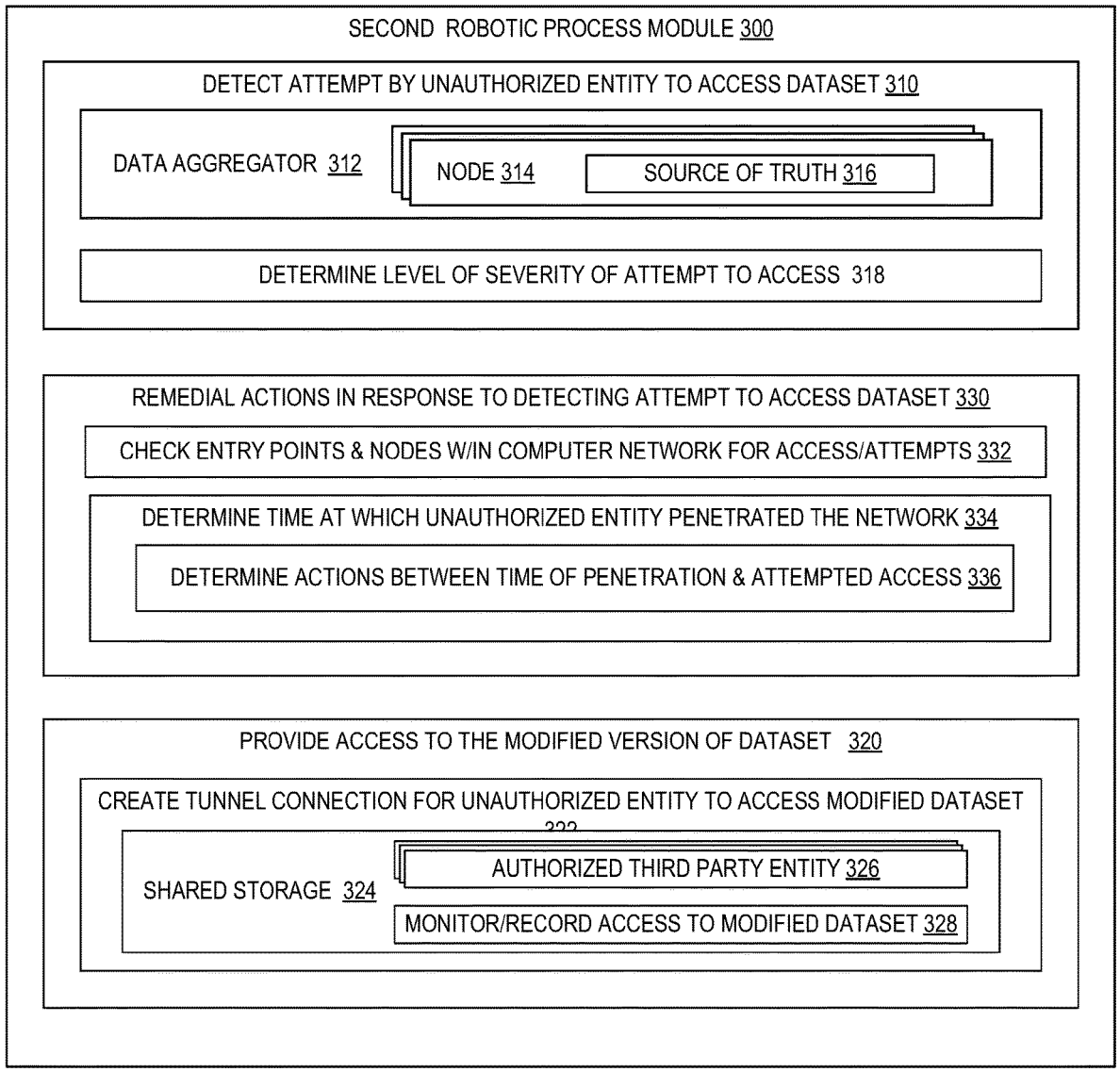
Figure 5:
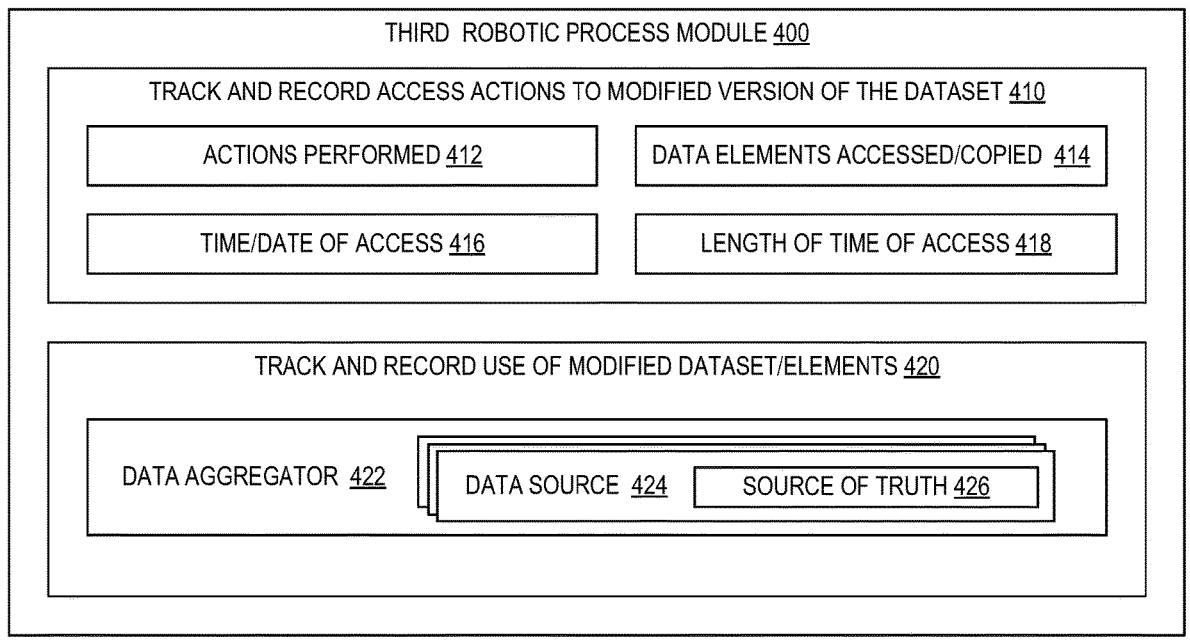
Figure 6:
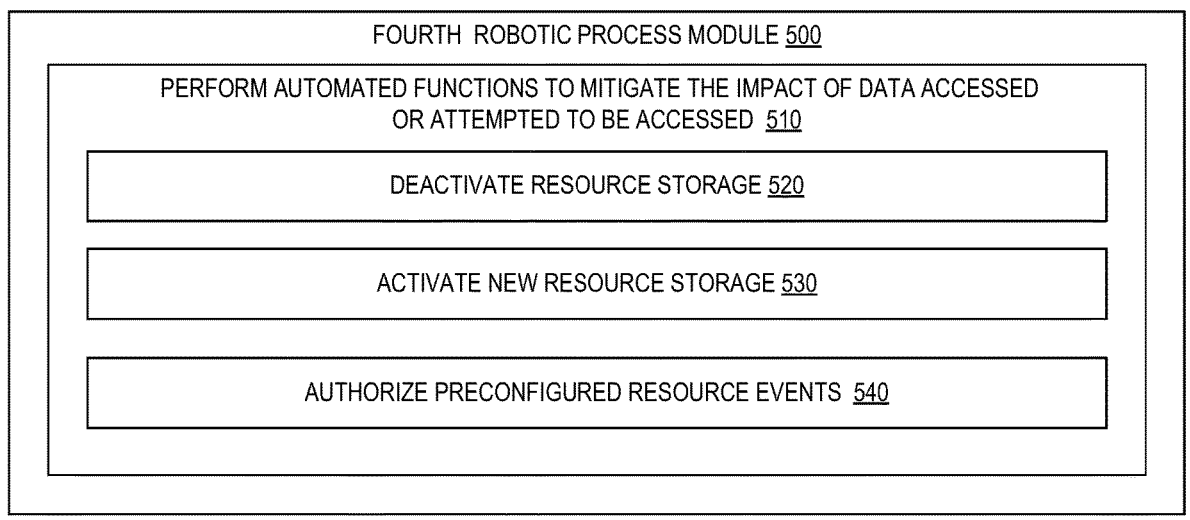
Figure 7:
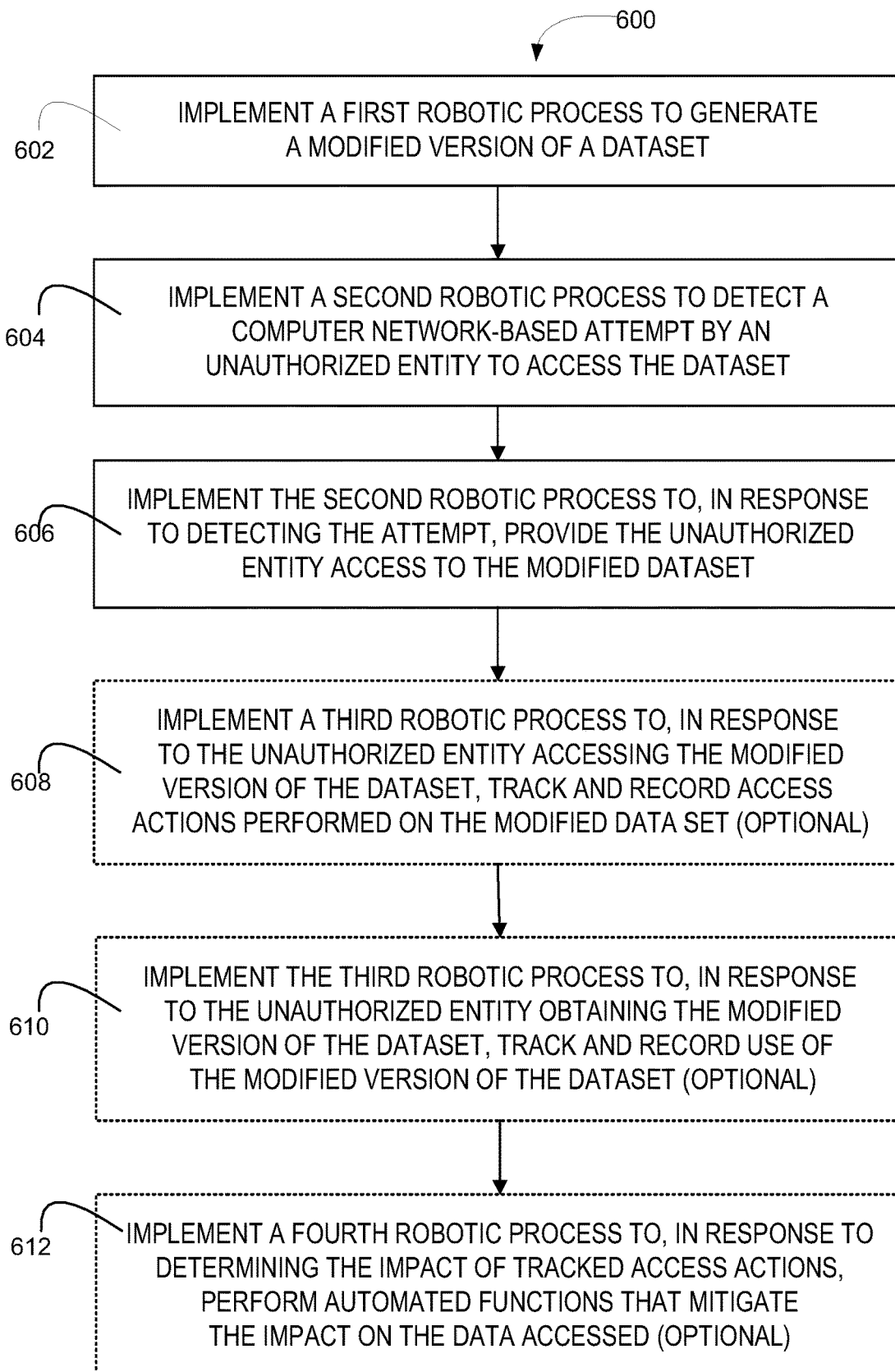

Having thus described embodiments of the invention in general terms, reference will now be made the accompanying drawings, wherein:

FIG. 1 provides a schematic diagram of a system for enhanced network security, in accordance with embodiments of the invention;

FIG. 2 provides a more detailed schematic diagram of a system for enhanced network security, in accordance with alternate embodiments of the invention;

FIG. 3 provides a block diagram of a first robotic process module configured to generate a modified version of a dataset, in accordance with embodiments of the invention;

FIG. 4 provides a block diagram of a second robotic process module configured to detect an attempt, by an unauthorized entity, to access a dataset and, in response to such detection, provide the unauthorized entity access to a modified version of the dataset, in accordance with embodiments of the invention;

FIG. 5 provides a block diagram of a third robotic process module configured to, in response to the unauthorized entity accessing a modified version of the dataset, track and record information associated access actions performed by the unauthorized entity, in accordance with embodiments of the invention;

FIG. 6 provides a block diagram of a fourth robotics process module configured to, in response to the unauthorized entity attempting to access the dataset, perform automated functions to mitigate the impact of the attempt to access the dataset, in accordance with embodiments of the invention; and FIG. 7 provides a flow diagram of a method for enhanced network security, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and the like are provided which provide for heightened computer network security. Specifically, the present invention implements robotic process automation to investigate the occurrence of unauthorized attempts to access and/or copy data and mitigate damages in the event that a computer network has been penetrated and/or a data breach has or may have occurred.

In specific embodiments of the invention, robotic process automation is used be generate modified datasets. A modified data set includes one or more and, in some embodiments all, modified data elements. The modified data elements may be such that they are unusable to the unauthorized entity and/or undetectable to the unauthorized entity. In this regard, the modified data elements may be reasonably similar to actual data elements, such that the unauthorized entity is unable to detect that the data elements have been modified (i.e., the unauthorized entity believes they have accessed/copied the actual data set). For example, the modified data elements may include reasonable modifications without affecting timestamps, data format (i.e., same number and configuration of rows, columns and the like) and other characteristics of the data element or dataset. The modified data elements and or modified data sets may be modified so as to not include any actual confidential information. In specific embodiments of the invention RPA is used to generate one or more random modified datasets for each data file/data set that an entity creates. In this regard, the random modified datasets may be batch generated and stored prior to an attempt by an unauthorized to access the actual dataset or, in other embodiments, the modified dataset may be generated, on demand, at the time of an unauthorized attempt to access the dataset.

Additionally, according to embodiments of the invention, robotics process automation is implemented to detect an attempt by an unauthorized entity to access a dataset and, in response to such detecting provide the unauthorized entity access to a modified dataset. The modified dataset having one or more, in some embodiments all, data elements modified such that the modified data elements are a reasonable facsimile of the actual data elements without providing actual confidential information. Thus, instead of providing the unauthorized entity access to the actual dataset, the unauthorized user is provided access to the modified, or otherwise "fake" dataset.

Once the unauthorized entity has access to the modified data set, robotic process automation may be used to monitor (i.e., track and record) the unauthorized entities actions taken on the modified dataset and check points of entry and other nodes in the computer network for attempts by the unauthorized entity to gain entry or access the node. Further, once the unauthorized entity has retrieved or otherwise copied at least a portion of the modified dataset, robotics process automation may be used to monitor the authorized entities use of dataset or date elements. Such use of the dataset/data elements may be conducted by aggregating data from a plurality of data sources and determining a source of truth based on the aggregated data, such that the source of truth indicates that at least one of the data sources is using at least a portion of the modified dataset.

In other embodiments of the invention, robotic process automation is implemented to mitigate any damages or possible damages associated with an attempt to access a dataset. In this regard, in response to detecting an attempt, robotic process automation may be invoked to determine a point of entry and a time of computer network penetration and determine/recover unauthorized entity actions that transpired from the time of computer network penetration until the time of the attempt to access the dataset. Such actions are analyzed for impact and, in response to the analysis, a robotics process automation may perform automated functions/actions that mitigate the impact of the actions, such as functions/actions that mitigate the impact of data accessed, such as deactivating resource storage, activating new resource storage, authorizing preconfigured resource events and the like.

Referring to FIG. 1 a schematic diagram is shown of a system 10 for providing enhanced network security, in accordance with embodiments of the invention. The system 10 is implemented in a distributed computing network 20, which allows for computerized communication of data between different computing platforms, apparatus, devices and the like. The distributed computing network 20 may one or more intranets, the Intranet including cloud computing and/or a combination of the Internet and one or more intranets.

The system 100 includes a storage unit 30 that is configured to store one or more datasets 40. The datasets 40 may contain confidential information that is desired by an unauthorized entity (i.e., a "hacker" or the like), which may benefit from gaining access to or otherwise possessing the dataset. While the system 10 shown in FIG. 1 includes only one storage unit 30, in typically large entities, the system is likely to include a plurality of storage units 30 storing a plurality of different datasets 40.

The system 100 additionally a computing platform 100 having a memory 110 and at least one first processor 120 in communication the memory 110. The computing platform 100 may be implemented in one or more network devices, such as servers, personal computers and any other device capable of network connectivity. As shown in FIG. 1 the computer platform 100A, 100B is implemented on two separate networked devices, such as servers or the like. However, in other embodiments of the invention more or less network devices may implement the computing platform 100.

The computing platform 100 is configured to execute algorithms, such as modules, routines, applications and the like. The memory 110 may comprise volatile and non-volatile memory, such as read-only and/or random-access memory (RAM and ROM), EPROM, EEPROM, flash cards, or any memory common to computer platforms). Moreover, memory 110 may comprise cloud storage, such as provided by a cloud storage service and/or a cloud connection service. Processor 120 may be an application-specific integrated circuit ("ASIC"), or other chipset, logic circuit, or other data processing device. Processor 120 may execute an application programming interface ("API") (not shown in FIG. 1) that interfaces with any resident programs, such as first and second robotic process modules 200, 300 or the like stored in the memory 110 of the computing platform 110.

Processor 120 may include various processing subsystems (not shown in FIG. 1) embodied in hardware, firmware, software, and combinations thereof, that enable the functionality of the computing platform 100 and the operability of the computing platform 100 on the distributed computing network 20 (shown in FIG. 1). For example, processing subsystems allow for initiating and maintaining communications and exchanging data with other networked devices. For the disclosed aspects, processing subsystems of processor 120 may include any subsystem used in conjunction with first and second robotic process modules 200, 300 and related sub-routines, algorithms, sub-algorithms, modules, sub-modules thereof.

The memory 110 of computing platform 100 stores a first robotic process module 200 that is executable by the one or more processors 120 and configured to generate a modified version 50 of a dataset 40, in accordance with embodiments of the present invention. The modified version 50 (i.e., "fake") of the dataset may include a plurality of modified data elements, or in some embodiments all of the data elements are modified, that are reasonable facsimiles of the actual data elements. In this regard, the first robotic process module 200 may implement a random data element generator that is configured to randomly generate data elements that reasonably differ from the actual data elements, such that the modified version 50 of dataset 40 does not include any actual confidential data elements, however; the difference in the data elements is not readily identifiable to the unauthorized entity. For example, the modified data elements may have modified metadata that is similar to the actual metadata but does not provide for the actual metadata associated with confidential information to be divulged. Moreover, the modified version 50 of the dataset 40 is configured to have the same or only reasonable modifications to the timestamps, format (e.g., number of rows, columns and the like) and other data set characteristics. In other embodiments of the invention, the modified version 50 of the dataset 40 may comprise corrupt or otherwise unusable data, such corrupt or unusable data will typically be, but is not required to be, readily identifiable to the unauthorized user.

The memory 110 of computing platform 100 stores a second robotic process module 300 that is executable by the one or more processors 120 and detect 310 an attempt by an unauthorized entity to access a dataset 40 and, in response to such detection, provide the unauthorized entity access 320 to the modified version 50 of the dataset 40. While the system 10 shown and described in FIG. 1 includes two distinct robotic process modules (i.e. first and second robotic modules 200 and 300) it should be noted that the system may include more or less robotic process modules. In this regard the functions that are described herein as being configured for first and second robotic modules 200 and 300 may be performed by a single robotic module or by more than two robotic modules. Moreover, in certain specific embodiments of the invention, a least a portion of the functions described herein as being configured for any one specific robotic process module may be performed by other modules, applications, routines, algorithms or the like absent the use of robotic processing.

Referring to FIG. 2, a schematic diagram is shown of a system 10 for providing enhanced network security, in accordance with embodiments of the invention. The system 10 of FIG. 2 provides for alternative embodiments of the invention that were not shown and described in reference to FIG. 1. As shown in FIG. 2 the computer platform 100A, 100B, 100C and 100D is implemented on four separate networked devices, such as servers or the like. However, in other embodiments of the invention more or less network devices may implement the computing platform 100.

In the alternate system 10 of FIG. 2 the memory 110 of computing platform 100 stores third robotic process module 400 that is executable by the one or more processors 120 and configured to, in response to the unauthorized entity accessing the modified version 50 of the dataset 40, track 410 and record information associated access actions performed by the unauthorized entity. The information associated with access actions may include action performed (i.e., data viewed, data copied and the like), which data elements were viewed or copied, time and/or date of access, length of time of access and the like. In addition, third robotic process module 400 is configured to, in response to the unauthorized entity obtaining (i.e., copying or the like) at least a portion of the modified version 50 of the dataset 40, monitor/track 420 and record the unauthorized use of data elements within the at least a portion of the modified version 50 of the dataset 40. The system stores copies of the modified version 50 of the dataset 40 and, thus, use of the modified version of the dataset can be accomplished by comparing the metadata associated with data used at various data sources with the metadata associated with the modified data elements in modified version 50 of the dataset 40. If a match occurs between the data used at a data source and data elements in the modified version 50 of the dataset 50, the modified version 50 if the dataset 40 is deemed to have been used/implemented by the unauthorized entity. In specific embodiments of the system 10, the third robotic process module 400 may be configured to receive and aggregate data from a plurality of data sources (i.e., network data source entities accessible to the public (e.g., websites) or the like) to determine a source of truth (i.e., determine that one or more of the modified data elements in the at least portion of the modified version 50 of the dataset 40 is, in fact, being used by one or more of the data sources.

In other embodiments of the system 10, the memory the memory 110 of computing platform 100 stores fourth robotic process module 500 that is executable by the one or more processors 120 and configured to, in response to the unauthorized entity attempting to access the dataset 40 or, in some embodiments, actually accessing the dataset 40 (i.e., a data breach) perform automated functions 510 to mitigate the impact of the attempt to access or actual access of the dataset 40. For example, if the dataset 40 includes confidential information related to individuals or entities, the automated functions may include immediate generation and initiation of communication of alerts to the applicable individual or entities to notify the individuals of the data breach or the attempt at accessing/breaching the data. Moreover, the alerts may be configured to include instructions on actions that the individual or entity should take in response to the data breach or attempted data breach, such as including accessible hyperlinks to network sites that allow the individual/entity to change confidential information, such as passwords and the like. In addition, the automated functions may include taking actions to deactivate resource storage, such as financial accounts or the like, activating new resource storage to take the place of the deactivated resource storage, and authorizing the occurrence previously preconfigured resource events, e.g., recurring financial payments or the like, associated with the deactivated resource storage.

It should be noted that the system 10 may include more or less robotic process modules. In this regard the functions that are described herein as being configured for first, second, third and fourth robotic modules 200, 300, 400 and 500 may be performed by a less than four robotic modules or by more than four robotic modules. Moreover, in certain specific embodiments of the invention, a least a portion of the functions described herein as being configured for any one specific robotic process module may be performed by other modules, applications, routines, algorithms or the like absent the use of robotic processing.

Referring to FIG. 3, a detailed block diagram is presented of the first robotic process module 200, in accordance with embodiments of the present invention. As previously discussed, the first robotic process module 200 is configured to generate at least one modified version 50 of a dataset 40. In specific embodiments of the system, the first robotic process module 200 includes a batch generator 210 configured to generate and store one or more modified versions 50 of each dataset 40 created or received by the entity associated with system or the plurality of datasets 40 including confidential data that are created or received by the entity associated with system. In this regard, the batch generator 210 may be configured to generate and store the modified version 50 of the dataset 40 prior to an occurrence of attempt by an unauthorized entity to access the dataset. As such, modified versions 50 of the dataset 40 will pre-exist for at least all datasets 40 that include confidential information, such that the modified versions can readily be available in the event that an attempt to access the dataset 40 is detected.

As previously discussed in relation to FIG. 1, the modified version 50 of the dataset 40 may include a plurality of modified data elements 52, or in some embodiments all of the data elements in the modified version 50 are modified data elements 52. In specific embodiments, the modified data elements 52 may be configured as reasonable facsimiles of the actual data elements. In this regard, the first robotic process module 200 may implement a random data element generator that is configured to randomly generate data elements that reasonably differ from the actual data elements, such that the modified version 50 of the dataset 40 does not include any actual confidential data elements; however, the difference in the data elements is not readily identifiable to the unauthorized entity. For example, the modified data elements may have modified metadata that is similar to the actual metadata but does not provide for the actual metadata (i.e., confidential information) to be divulged. In other embodiments of the invention, the modified version 50 of the dataset 40 may one or more and in some instances all, modified data elements 52 that corrupt or otherwise unusable, such corrupt or unusable data will typically be, but is not required to be, readily identifiable to the unauthorized user.

In other embodiments of the invention, the first robotic process module may include an on-demand generator 230 configured to generate and store a modified version 50 of the dataset 40, in response to detection of the attempt by the unauthorized entity to access the dataset.

In specific embodiments of the invention, more than one modified version 50 of any one dataset 40 may be generated with each different modified version being assigned a security level 220. In such embodiments of the invention the degree/level of the attempted access and/or degree/level of the authorized entity, if known, is associated with a particular security level 220 and, as such, the modified version 50 of the dataset 40 associated with a specified security level 220 is the one that the unauthorized entity is provided access to. For example, if the degree/level of attempted access and/or the degree/level of the unauthorized entity is determined to of a high security level 220 (e.g., multipronged attack on the dataset and or highly suspect/notorious hacking entity), the modified version 50 of the dataset 40 that the unauthorized entity is provide access will have a corresponding high security level 200 (e.g., corrupt or otherwise unusable data to prevent the unauthorized entity from using the data), However, if the degree/level of attempted and/or degree/level of the unauthorized entity is determined to of a lower security level 220 (e.g., single-prong attack on the dataset and or internal entity), the modified version 50 of the dataset 40 that the unauthorized entity is provide access will have a corresponding lower security level 200 (e.g., reasonable facsimiles of the actual data elements to allow the unauthorized to use the data, so that the system can investigate the use of the data and/or determine identity of the unauthorized entity). In those embodiments in which the modified version 50 of the dataset 40 is generated, on-demand, in response to detection of the attempt, by the unauthorized entity, to access the dataset 40, the security level 220 of the modified version 50 is determined dynamically prior to generating the modified version 50 based on the level/degree of the attempt to access and/or, if known, the identity of the unauthorized entity.

In other embodiments of the invention, the modified version 50 of the dataset 40 and/or modified data elements 52 within the modified version 50 is configured to include logic 230 that may be used to identify the identity 232 of the unauthorized entity and/or identify the use 234 of the modified data elements by the unauthorized entity. For example, the logic 230 may be configured to communicate back to the system the identifiers associated with the unauthorized entity, such hop/port identifiers that the dataset encounters once the unauthorized entity has obtained/copied the data. In additional examples, the logic may be configured to identify applications, programs that the data encounters as a means of identifying the use of the data.

Referring to FIG. 4, a detailed block diagram is presented of the second robotic process module 300, in accordance with embodiments of the present invention. As previously discussed, the first robotic process module 200 is configured to detect 310 an attempt, by an unauthorized entity, to access a dataset 40 and, in response to such detection, provide the unauthorized entity access 320 to the modified version 50 of the dataset 40. In specific embodiments of the invention, the second robotic process module 300 is configured to implement a data aggregator 312 that receives an aggregates data from a plurality of network nodes 314 to verify the occurrence of the attempt to access the dataset 40. In specific embodiments of the invention, the data aggregator 312 in conjunction with the robotic process module 300 determines a source of truth 316, which verifies the occurrence of the attempt to access the dataset and which nodes 314 in the network are associated with the attempt.

As previously discussed, in addition to detecting 310 the attempt, by an unauthorized entity, to access a dataset 40, the second robotic process module 300 may determine the level/degree of severity of the attempt and/or, if known, the level/degree of severity of the unauthorized entity. The level/degree of severity of the attempt and/or, if known, the level/degree of severity of the unauthorized entity is subsequently used to determine which security level 220 (shown in FIG. 3) is applicable to the modified version 50 of the dataset 40 (i.e., which modified version 50 of the dataset 40, as defined by the security level 220 should be retrieved from data storage or dynamically generated).

In alternative embodiments of the invention, the second robotic process module 300 may be configured to perform remedial actions 330 in response to detecting an attempt, by an unauthorized entity, to access a dataset 40. Such remedial actions may include, but are not limited to, checking entry points and nodes 332 within the computer network to identify the point of penetration and the communication path within in the network prior to the attempt to access the dataset 40 and to identify any other access attempts made by the unauthorized entity and the nodes associated with such attempts. In addition, the second robotic module 300 may be configured to determine the time at which the unauthorized entity penetrated (i.e., gained access to) the computer network, and once the time is determined, determine and assess actions 336 performed on the computer network from at least the time at which the unauthorized entity penetrated (in some instance, from a predetermined period before the time of penetration) up until the time of the attempted accessing of the dataset. Assessing the actions provides for determining if any actions performed in the network during the aforementioned period of time were affected by or a result of the unauthorized entity. In addition, the invention may provide for a neural/learning network (not shown in FIG. 4) used in conjunction with the robotic modules that receives the results of the remedial actions, i.e., notification of the entry points and nodes affected as well as the actions affected by or a result of the unauthorized entity for the purpose of determining future means for preventing such penetration and attempts/attacks in the future.

In specific embodiments of the invention, the second robotics entity is configured to provide the unauthorized entity access 320 to the modified version 50 of the dataset 40 by creating tunnel connection 322 for the unauthorized entity to access the modified dataset 322. The tunnel connection is configured such that unauthorized entity is unaware that they are being redirected to a different storage location than the location of the dataset 40. In this regard the tunnel connection may provide for the endpoint (i.e., the storage location of the modified version 40 of the dataset 50) to have the same IP address as the storage location of the actual dataset 40. In specific embodiments of the invention, the tunnel connection is configured to an endpoint that is shared storage 324 that is accessible to one or more authorized third-party entities 326 (e.g., law enforcement, government agencies and the like) and provides for authorized third-party entities to monitor 328 (e.g., track and record) access actions performed by the unauthorized entity to the modified version 40 of the dataset 50. In other embodiments of the invention, the tunnel connection is made directly to an authorized third-party entity storage site, such that only the third-party entity is able to monitor (e.g., track and record) access actions performed by the unauthorized entity to the modified version 40 of the dataset 50. In those embodiments of the invention in which a neural/learning network is implemented, the authorized third-party entities may be in communication with the neural/learning network to communicate results of the monitoring of the access actions performed by the unauthorized entity in accessing the modified version 50 of the dataset 40.

Referring to FIG. 5, a detailed block diagram of the third robotic process module 400 is presented, in accordance with specific embodiments of the invention. The third robotic process module 400 is configured to, in response to the unauthorized entity accessing the modified version 50 of the dataset 40, track 410 and record information associated access actions performed by the unauthorized entity. The information associated with access actions may include action performed 412 (i.e., data viewed, data copied and the like), which data elements were viewed or copied 414, time and/or date of access 416, length of time of access 418 and the like.

In addition, third robotic process module 400 is configured to, in response to the unauthorized entity obtaining (i.e., copying or the like) at least a portion of the modified version 50 of the dataset 40, monitor 420 (e.g., track and record) the unauthorized use of data elements within the at least a portion of the modified version 50 of the dataset 40. The system stores copies of the modified version 50 of the dataset 40 and, thus, use of the modified version of the dataset can be accomplished by comparing the metadata associated with data used at various data sources with the metadata associated with the modified data elements in modified version 50 of the dataset 40. If a match occurs between the data used at a data source and data elements in the modified version 50 of the dataset 50, the modified version 50 if the dataset 40 is deemed to have been used/implemented by the unauthorized entity. In specific embodiments of the system 10, the third robotic process module 400 may be include a data aggregator 422 configured to receive and aggregate data from a plurality of data sources 424 (i.e., network data source entities accessible to the public (e.g., websites) or the like) to determine a source of truth 426 (i.e., determine that one or more of the modified data elements in the at least portion of the modified version 50 of the dataset 40 is, in fact, being used by one or more of the data sources.

Referring to FIG. 6, a detailed block diagram of the fourth robotic process module 500 is presented, in accordance with specific embodiments of the invention. The fourth robotic process module 500 is configured, in response to the unauthorized entity attempting to access the dataset 40 or, in some embodiments, actually accessing the dataset 40 (i.e., a data breach) perform automated functions 510 to mitigate the impact of the attempt to access or actual access of the dataset 40. Such actions may be configured to automatically occur after determination that a dataset has been accessed or after detecting an attempt to access a dataset. In other embodiments, ancillary data processing may analyze data associated with the detected attempt to access to a dataset to determine the impact of the attempt on the data contained in the dataset and, based on the determined impact, determine if automated functions should be executed. For example, if the dataset 40 includes confidential information related to individuals or entities, the automated functions may include immediate generation and initiation of communication of alerts to the applicable individual or entities to notify the individuals of the data breach or the attempt at accessing/breaching the data. Moreover, the alerts may be configured to include instructions on actions that the individual or entity should take in response to the data breach or attempted data breach, such as including accessible hyperlinks to network sites that allow the individual/entity to change confidential information, such as passwords and the like.

In addition, the automated functions may include taking actions to prevent loss of resources associated with the confidential information in the dataset 40. Such automated functions may include, but are not limited to deactivate resource storage 520, such as financial accounts or the like, activating new resource storage 530 to take the place of the deactivated resource storage, and authorizing the occurrence previously preconfigured resource events 540 associated with the deactivated resource storage e.g., recurring financial payments from a currently deactivated account or the like.

Referring to FIG. 7, a flow diagram is presented of a method 600 for enhancing network security, in accordance with embodiments of the invention. At Event 810, a first robotic process is implement to generate a modified version of a dataset. As previously described, the modified version of the dataset may include a plurality of modified data elements. In specific embodiments all of the date elements or at least those data elements representing confidential information are modified. Such modification may comprise altering the data elements such that the modified data elements are reasonable facsimiles of the actual data elements (i.e., data elements intended to dupe the unauthorized entity into believing they have accessed or obtained the actual dataset) or, other embodiments, the modified data elements may include corrupt or unintelligible data elements that are unusable by the unauthorized entity. The type of modified dataset, referred to herein as the security level, that is provided to an unauthorized entity may be based on the level/degree threat posed by the access attempt and/or the level/degree or threat posed by the unauthorized entity. As previously described the modified dataset may be generated and stored prior to detection of an attempt to access the dataset. In such embodiments, one or more modified datasets may be generated in batch-type format for any dataset containing confidential information. In other embodiments of the invention, the modified version of the dataset may be generated, on-demand, in dynamic response to detecting the occurrence of an attempt, by an unauthorized entity, to access a dataset.

At Event 604, a second robotic process to implemented to detect a computer network-based attempt, by an unauthorized entity, to access a dataset. In specific embodiments of the method, such detection may include aggregating data from various nodes with the computer network to verify that an attempt to access has occurred and the node(s) at which the attempt is detected (i.e., source of truth).

At Event 606, a third robotic process is implemented to, in response to detecting an attempt, by an unauthorized entity to access a dataset, provide the unauthorized entity access to the modified dataset. In specific embodiments of the invention the modified version of the dataset that is provided to the unauthorized entity will correspond to a security level that is associated with the degree/level of threat posed by the attempted access to the dataset and/or the degree/level of threat posed by the unauthenticated entity (e.g., internal vs external or the like). In other embodiments of the method, providing the unauthorized entity access to the modified dataset includes creating a tunnel connection to the modified dataset, such that, the tunnel connection is configured to dupe the unauthorized entity in believing they are accessing the actual dataset (e.g., same IP address as the storage location of the actual dataset). In other embodiment of the invention the tunnel connection may be to an authorized third-party entity storage location or to shared storage accessible to one or more authorized third-party entities (e.g., law enforcement, government agencies, investigation entities or the like), such that the authorized third-party entity may monitor the unauthorized entities accessing and/or use of the modified version of the dataset.

At optional Event 608, a third robotic process is implement to, in response to the unauthorized entity accessing the modified version of the dataset, track and record access actions performed by the unauthorized entity on the modified dataset. The access actions may include, but are not limited to, the type of access, the degree of access (i.e., which data elements were accessed/copied), the time/date of access, the length of time of access and the like).

At optional Event 610, the third robotic entity may be implemented to, in response to the unauthorized entity obtaining/copying at least a portion of the modified version of the dataset, track and record use of the modified version of the dataset. In specific embodiments of the method, such detection may include aggregating data from various nodes with the computer network to verify that an attempt to access has occurred and the node(s) at which the attempt is detected (i.e., source of truth). In such embodiments of the method, tracking use of the dataset may include receiving and aggregating data from a plurality of data sources (network entities, such as publically accessible websites) to determine a source of truth (i.e., use of one or more of the modified data elements in the modified version of the dataset by one or more of the data sources).

At optional Event 612, a fourth robotic process is implemented to, in response to detecting occurrence of an attempt to access or actual access and/or determining the impact of the attempt (based on tracked access actions or the like), perform one or more automated functions that mitigate the impact on the data accessed or attempted to be accessed. In specific embodiments of the method, such automated actions may include generating and communicating alerts to individuals and/or entities compromised by the data breach or attempted data breach. While in other embodiments of the method, the automated functions may include deactivating resource storage, such as accounts associated with account numbers divulged in the dataset, activating new resource storage, such as accounts, in response to deactivating resource storage and authorizing preconfigured resource events associated with deactivated resource storage.

Thus, as described above, embodiments of the present invention provides for provides for implementing robotic process automation (RPA) to enhance computer network security. Specifically, RPA is implemented to detect an unauthorized attempt to access a dataset and, in response, the unauthorized entity is provided access to a bot-generated modified dataset that includes modified data elements that are reasonable facsimiles of the actual data elements and do not expose confidential data. Once access to the modified data set is provided, RPA is used to track actions by the unauthorized entity accessing the modified data set and, once copied, RPA is implemented to track usage of the data by the unauthorized entity. Additionally, RPA is implemented to mitigate damages caused by attempts or actual accessing of the actual datasets by performing actions that prevent further damages, such as deactivating/activating resource storage and authorizing previously configured resource events.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for monitoring an unauthorized network intrusion, the system comprising:
    a computing platform including a memory and at least one processor in communication with the first memory;
    a first robotic process module stored in the memory, executable by the at least one processor and configured to generate a plurality of modified versions of a dataset, wherein each of the plurality of modified versions of the dataset are associated with a different level of severity of an attempt to access the dataset, wherein the different level of security are associated with a type of attempt to access the dataset and a type of unauthorized entity; and
    a second robotic process module stored in the memory, executable by the at least one processor, wherein the second robotic module is in distributed network communication with the first robotic process module and configured to:
        detect a computer network-based attempt by an unauthorized entity to access the dataset stored at a first storage location,
        determine a level of the severity of the attempt to access the dataset, wherein determining a level severity of the attempt to access the dataset includes determining a type of the attempt and a type of unauthorized entity,
        in response to detecting the computer network-based attempt to access the dataset and determining the level of severity of the attempt to access the dataset, create a tunnel connection that provides the unauthorized entity access to a shared storage location that stores one of the plurality of modified versions of the dataset corresponding to the determined level of severity of the attempt to access the dataset, wherein the shared storage location (i) has a same Internet Protocol (IP) address as the first storage location, and (ii) is accessible to one or more authorized third-party entities, wherein the authorized third-party entities access the shared storage to track and record the unauthorized entities accessing of the one of the plurality of modified versions of the dataset,
        wherein the unauthorized entity is prevented from accessing the dataset.

2. The system of claim 1, wherein the second robotic process module is further configured to detect the computer network-based attempt to access the data by:
    aggregating data from a plurality of nodes within the computer network; and
    determining a source of truth based on the aggregated data that indicates detection of the computer network-based attempt to access the data.

3. The system of claim 1, wherein the second robotic process module is further configured to, in response to detecting the computer network-based attempt to access the dataset, check points of entry and nodes within the computer network for other attempts by the unauthorized entity to access one or more other datasets.

4. The system of claim 1, wherein the second robotic process module is further configured to, in response to detecting the computer network-based attempt to access the dataset, determine a first point in time that the unauthorized entity penetrated the computer network.

5. The system of claim 4, wherein the second robotic process module is further configured to recover actions performed on the computer network by the unauthorized entity from at least the first point in time that the unauthorized entity penetrated the computer network until a second point in time that the attempt to access the dataset occurred, wherein the actions include one or more computer network entry points, computer network hardware and software accessed and data accessed.

6. The system of claim 5, further comprising a third robotic process module stored in the memory, executable by the processor, wherein the third robotic process module is in distributed computing network communication with the second robotic process module and configured to:
    in response to determining an impact on the data accessed based on analyzing tracked actions, perform automated functions that mitigate the impact on the data accessed, wherein the automated functions include deactivating resource storage associated with the data accessed, activating a new resource storage and authorizing pre-configured resource events associated with the data accessed.

7. The system of claim 1, further comprising a neural network module stored in the memory, executable by the at least one processor, configured to learn over time information related to unauthorized attempts to access datasets within the computing network, wherein the information is determined based on the authorized third-party entities monitoring of the unauthorized entities accessing of the one of the plurality of modified versions at the shared storage.

8. The system of claim 1, wherein the first robotic process module is further configured to generate the plurality of modified versions of a dataset, wherein each of the modified versions of the dataset include at least one modified data elements, each modified data element corresponding to a data element in the dataset and comprising metadata that is similar to metadata of a corresponding data element in the data set.

9. The system of claim 1, further comprising a third robotic process module stored in the memory, executable by the at least processor and configured to, in response to the unauthorized entity accessing the one of the plurality of modified versions of the dataset, track access actions performed by the unauthorized entity.

10. The system of claim 9, wherein the third robotic process module is further configured to, in response to the unauthorized entity obtaining at least a portion of the one of the plurality of modified versions of the dataset, monitor use of at least a portion of the one of the plurality of modified versions of the dataset.

11. The system of claim 10, wherein the third robotic process module is further configured to, in response to the unauthorized entity obtaining the at least a portion of the one of the plurality of modified versions of the dataset, aggregate data from a plurality of data sources and determine a source of truth based on the aggregated data, wherein the source of truth indicates use of at least a portion of the one of the plurality of modified versions by one or more of the plurality of data sources.

12. The system of claim 1, wherein the first robotic process module is further configured to generate a plurality of modified versions of a dataset, wherein the plurality of modified versions of the dataset are unusable to the unauthorized entity.

13. The system of claim 1, wherein the first robotic process module is further configured to generate a plurality of modified versions of a dataset, wherein each of the modified versions of the dataset includes logic that provides for, in response to the unauthorized user accessing or obtaining at least a portion of the one of the plurality of modified versions of the data set, at least one of (i) identifying the unauthorized entity, and (ii) identifying use of at least a portion of the one of the plurality of modified versions of the data set in a secondary system.

14. The system of claim 1, wherein the first robotic module is configured to generate the plurality of modified versions of the dataset prior to the second robotic module detecting the computer network-based attempt by the unauthorized entity to access the dataset or in response to detecting the computer network-based attempt by the unauthorized entity to access the dataset.

15. A computer-implemented method for protecting against unauthorized access of a dataset, wherein the computer-implemented method comprising the following steps executed by at least one computer processing device:
   implementing a first robotic process automation to generate a plurality of modified versions of a dataset, wherein each of the plurality of modified versions of the dataset are associated with a different level of severity of an attempt to access the dataset, wherein the different level of security are associated with a type of attempt to access the dataset and a type of unauthorized entity; and
   implementing a second robotic process automation to:
      detect a computer network-based attempt by an unauthorized entity to access the dataset stored at a first storage location,
      determine a level of the severity of the attempt to access the dataset wherein determining a level severity of the attempt to access the dataset includes determining a type of the attempt and a type of unauthorized entity, and
      in response to detecting the computer network-based attempt to access the dataset and determining the level of severity of the attempt to access the dataset, create a tunnel connection that provides the unauthorized entity access to a shared storage location that stores one of the plurality of modified versions of the dataset corresponding to the determined level of severity of the attempt to access the dataset, wherein the shared storage location (i) has a same Internet Protocol (IP) address as the first storage location, and (ii) is accessible to one or more authorized third-party entities, wherein the authorized third-party entities access the shared storage to track and record the unauthorized entities accessing of the one of the plurality of modified versions of the dataset,
   wherein the unauthorized entity is prevented from accessing the dataset.

16. A computer program product including a non-transitory computer-readable medium, the computer-readable medium comprising:
   a first set of codes for causing a computer to implement a first robotic process automation to generate a plurality of modified versions of a dataset, wherein each of the plurality of modified versions of the dataset are associated with a different level of severity of an attempt to access the dataset, wherein the different level of security are associated with a type of attempt to access the dataset and a type of unauthorized entity;
   a second set of codes for causing a computer to implement a second robotic process automation to detect a computer network-based attempt by an unauthorized entity to access the dataset stored at a first storage location;
   a third set of codes for causing a computer to implement the second robotic process automation to determine a level of the severity of the attempt to access the dataset, wherein determining a level severity of the attempt to access the dataset includes determining a type of the attempt and a type of unauthorized entity; and
   a fourth set of codes for causing a computer to implement the second robotic process automation to, in response to detecting the computer network-based attempt to access the dataset and determining the level of severity of the attempt to access the dataset, create a tunnel connection that provides the unauthorized entity access to a shared storage location that stores one of the plurality of modified versions of the dataset corresponding to the determined level of severity of the attempt to access the dataset, wherein the shared storage location (i) has a same Internet Protocol (IP) address as the first storage location, and (ii) is accessible to one or more authorized third-party entities, wherein the authorized third-party entities access the shared storage to track and record the unauthorized entities accessing of the one of the plurality of modified versions of the dataset.

* * * * *